United States Patent
Takahashi et al.

[11] Patent Number: 5,922,452
[45] Date of Patent: Jul. 13, 1999

[54] TITANIUM AND/OR TITANIUM ALLOY SINTERED FRICTION MATERIAL

[75] Inventors: Kyo Takahashi; Masahiro Yoshida; Yoshitoshi Hagiwara, all of Wako; Katsuyoshi Kondoh, Itami; Yoshishige Takano, Itami; Yukinori Yamashita, Itami, all of Japan

[73] Assignees: Honda Giken Kogyo Kabushiki Kaisha, Tokyo, Japan; Sumitomo Electric Industries, LTD., Osaka, Japan

[21] Appl. No.: 08/816,226

[22] Filed: Mar. 12, 1997

Related U.S. Application Data

[30] Foreign Application Priority Data

Mar. 21, 1996 [JP] Japan .................................. 8-089963

[51] Int. Cl.$^6$ ........................................................ B32B 5/16
[52] U.S. Cl. ........................ 428/323; 428/331; 428/364; 428/688; 428/697; 428/698
[58] Field of Search ........................................ 428/688, 697, 428/698, 364, 323, 329, 331

[56] References Cited

U.S. PATENT DOCUMENTS

| | | | |
|---|---|---|---|
| 5,482,742 | 1/1996 | Takamiya et al. | 427/156 |
| 5,576,358 | 11/1996 | Lem et al. | 523/153 |
| 5,620,791 | 4/1997 | Dwivedi et al. | 428/323 |

*Primary Examiner*—Elizabeth Evans
*Attorney, Agent, or Firm*—Nikaido Marmelstein Murray & Oram, LLP

[57] ABSTRACT

A sintered friction material having excellent high-temperature strength, heat-resistance, abrasion-resistance and $\mu$ characteristic, and capable of maintaining high friction coefficient stably is provided. The sintered friction material contains a foundation of titanium and/or titanium alloy powder, a solid lubricant and a fiber of hard material. The sintered friction material having the foundation of titanium and/or titanium alloy powder as the base is lined and joined onto a holder plate to form a friction pad suitable for use with a brake rotor made of titanium or titanium alloy.

16 Claims, 2 Drawing Sheets

TITANIUM AND/OR TITANIUM ALLOY SINTERED FRICTION MATERIAL

BACKGROUND OF THE INVENTION

The present invention relates to a sintered friction material having a foundation based on titanium and/or titanium alloy. This sintered friction material is suitable to a brake friction pad, particularly to a friction pad for a brake rotor made of titanium or titanium alloy.

Hitherto, a friction material containing foundation of Cu or Fe powder added with Sn, Zn powder, graphite, $MOS_2$ and hard material of $SiO_2$, $Al_2O_3$ is known. A brake pad made of the above customary friction material is used as a friction pad to a rotor made of cast iron, iron or stainless steel.

The brake pad for a rotor of cast iron, iron or stainless steel cannot be used for a disk rotor of titanium and/or titanium alloy not surface treated, because heat-resistance and abrasion-resistance are insufficient.

SUMMARY OF THE INVENTION

A sintered friction material of titanium and/or titanium alloy according to the present invention is characterized by containing a foundation of titanium and/or titanium alloy powder, a solid lubricant and a fiber of hard material.

Further, the present invention provides a sintered friction material of titanium and/or titanium alloy characterized by that at least one kind of element selected from Al, Ni, Co, Fe, Mn, Cu, V and Zr is contained in a foundation of titanium and/or titanium alloy powder.

The present invention provides a sintered friction material of titanium and/or titanium alloy characterized by that the fiber of hard material is a fiber of mullite.

Also, the present invention provides a sintered friction material of titanium and/or titanium alloy characterized by that the foundation is strengthened by mechanical alloying of powder of the foundation and sintered.

Further, the present invention provides a friction pad characterized by that a friction material lined and joined onto a holding plate is the above-mentioned sintered friction material based on the foundation of titanium and/or titanium alloy powder.

Furthermore, the present invention provides a friction pad suitable for use with a brake rotor made of titanium and/or titanium alloy.

Since the sintered friction material of the present invention has a foundation of titanium and/or titanium alloy, it is light and has excellent corrosion-resistance and heat-resistance. The foundation of titanium and/or titanium alloy strengthens the sintered friction material containing fiber of hard material and solid lubricant. The foundation can be strengthened by mechanical alloying to improve its strength. While the customary Cu series sintered pad lacks high-temperature strength and therefore heat-resistance, the sintered friction material of the present invention has excellent high-temperature strength, heat-resistance, abrasion-resistance, $\mu$ characteristic and the like because the foundation is constituted by titanium and as occasion demands the titanium powder is mechanical alloyed and then sintered. This sintered friction material is suitable to a brake friction pad, particularly to a friction pad for a brake rotor made of titanium or titanium alloy.

DETAILED DESCRIPTION OF THE PREFERRED EMBODIMENT

Figure 1:
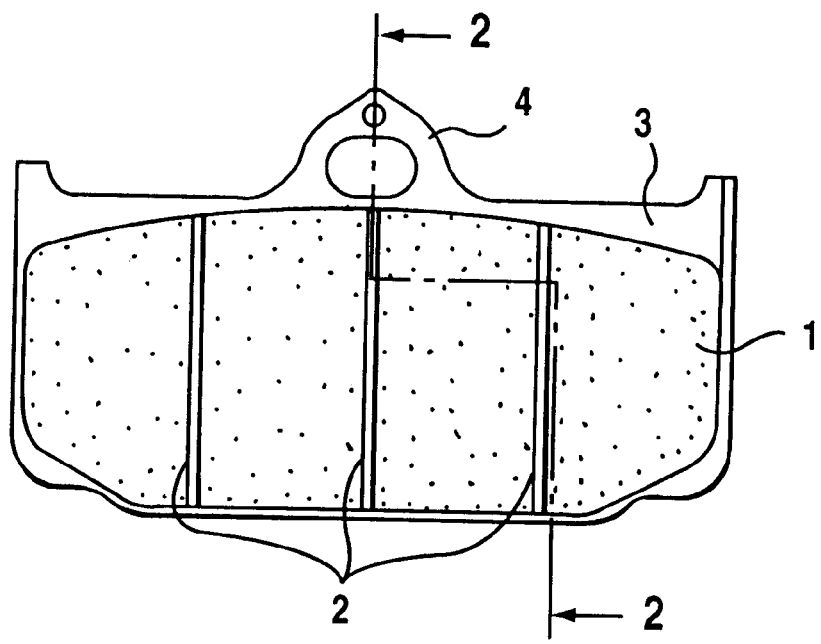
FIG. 1 is a plan view showing a brake friction pad according to a preferred embodiment of the present invention.

In the present invention, powder of pure titanium and titanium alloy is used as raw material of the foundation. The powder of titanium alloy may be prepared by mixing powder of pure titanium and powder of an additive element for alloying.

With respect to particle size of the powder of titanium or titanium alloy, coarse particles of 150 mesh or more and fine particles of 450 mesh or less are used respectively as occasion demands. For example, the coarse particles and the fine particles may be mixed in a ratio of 1 to 1 for use.

As for the solid lubricant, at least one kind of substance selected from graphite, $WS_2$, $MoS_2$, BN, $CaF_2$ is used in a content of 2 to 10 wt. % preferably 4 to 7 wt. %, for example.

The foundation of titanium and/or titanium alloy contains at least one kind of element selected from Al, Ni, Co, Fe, Mn, Cu, V, Zr to obtain abrasion-resistance. Contents of these elements are as follows by weight; Al: 1–10%, Ni: 1–10%, Co: 1–5%, Fe: 1–10%, Mn: 1–5%, Cu: 1–5%, V: 1–10%, Zr: 1–5%. The total content of the selected elements is preferably 1–10%.

As for the fiber of hard material, a fiber of mullite is preferable. The diameter and length of the fiber may be 3 $\mu$m and 400 $\mu$m respectively, for example.

The foundation of titanium and/or titanium alloy can be strengthened by mechanical alloying in which the powder is ground and granulated mechanically for alloying. Further, at least one kind of element selected from Al, Ni, Co, Fe, Mn, Cu, V, Zr may be contained in the foundation for alloying to strengthen the foundation. Particle size of the Ti powder is 30 $\mu$m–100 $\mu$m for example, but any other proper particle size can be used in accordance with flowing nature of the powder. Particle size of Al, Ni, Co, Fe, Mn, Cu, V, Zr is 30 $\mu$m–50 $\mu$m for example, but also in this case, any other proper particle size can be used in accordance with flowing nature of the powder.

The mechanical Alloying is carried out as follows, for example. Powder of titanium and/or titanium alloy which is the foundation, or the powder containing at least one kind of element selected from Al, Ni, Co, Fe, Mn, Cu, V, Zr is put together with balls into a receptacle filled with a gas such as $N_2$, Ar to be mixed and ground mechanically. That is, respective powders are beaten out and torn by the balls and dispersed. The powder may be mixed making use of a cross rotor mixer.

Then, the powder is shaped by a hydraulic press, a mechanical press or CIP for example and sintered in a reducing gas, an inert gas or a vacuum.

The sintered friction material according to the present invention is suitable to a brake friction pad, particularly to a friction pad for a brake rotor made of titanium or titanium alloy. Therefore, the brake rotor made of titanium or titanium alloy will be described.

The brake rotor made of titanium or titanium alloy is of $\alpha+\beta$ phase having equiaxed crystal grain to reduce deformation owing to thermal stress and sizes of coarsened crystal grains thereof are 300 $\mu$m–4 mm. It is produced by heat treating on $\beta$ transas and hardening the titanium alloy to form the equiaxed crystal grains.

As α+β type titanium alloy for the brake rotor, for example, Ti-6Al4V, Ti-6Al6V2Sn, Ti-6Al2Sn4Zr6Mo and the like are known. In the brake rotor made of the titanium alloy, metallurgic structure of the rotor body is controlled and crystal grains are equiaxed in α+β phase so that a customary coating treatment is unnecessary. While heat conductivity of titanium is low compared with that of customary iron series raw material, in the brake rotor of titanium, strain owing to thermal stress can be reduced by the α+β phase having the equiaxed crystal grains, thus a suitable brake rotor of titanium of light weight and improved endurance having no problem of rust can be obtained.

More concretely, Ti-6Al4V, which is a α+β type titanium alloy, is heat treated 2 hours at 1050° C. on β transas and quenched. A crystal structure hard to be distorted at a high temperature is obtained by remaining β phase of equiaxed crystal produced at the quenching. The crystal grains are coarsened to 300 μm–4 mm to improve greatly deformation toughness against thermal stress.

Figure 2:
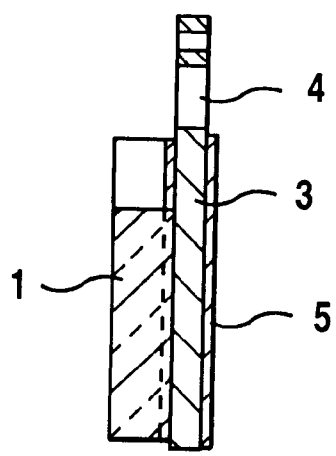
FIG. 2 is a sectional view showing the brake friction pad.

The sintered friction material of the present invention is suitable to a brake friction pad. FIGS. 1 and 2 show a pad of a titanium and/or titanium alloy sintered material according to the present invention.

FIG. 1 is a plan view of a friction pad for a disk plate and FIG. 2 is a B—B section of FIG. 1. As shown in FIGS. 1 and 2, a friction pad 1 of a titanium alloy is lined and joined onto a holder plate 3 made of metal for example. The sintered friction pad 1 has several recessed grooves 2 shaped extending about radially of the brake disk. The grooves 2 are formed only on the friction pad 1 which has a continuous surface on the side of the holder plate 3 to be lined and joined to the plate 3. The holder plate has an attaching part 4 and a ceramic coating 5.

Next, examples of the present invention are shown.

According to the present invention, titanium and/or titanium alloy powder is used as a base of foundation of a sintered friction material. Concretely, the titanium and titanium alloy powder are used as principal components for the matrix and at least one kind of substance selected from graphite, $WS_2$, $MoS_2$, BN, $CaF_2$ is added as solid lubricant. With respect to the graphite, a scale-like natural graphite is preferable for preventing seizure and improving sliding nature. Further, in order to obtain excellent abrasion-resistance, at least one kind of element selected from Al, Ni, Co, Fe, Mn, Cu, V, Zr is added.

As for examples of the sintered friction material of titanium and/or titanium alloy powder foundation, two series of (Ti—AlCuX)+Gr+Fiber and (Ti—CuX)+Gr+Fiber are typical. X means Ni, Co, Fe, Mn, V, Zr and Gr means graphite. Fiber is mullite fiber of 3 μm (diameter)×400 μm (length).

Mechanical alloying and sintering are carried out in order to improve heat-resistance of the alloy powder, as occasion demands.

With respect to particle size of the powder of titanium or titanium alloy, coarse particles of 150 mesh or more and fine particles of 450 mesh or less are used respectively in accordance with necessity for strengthening the matrix.

As an example of the composition, a mechanical alloyed foundation comprising Ti and 30% of Ni, Al, Fe, Mo contains 4–5% of Gr and 1–3% of Fiber.

Figure 3:
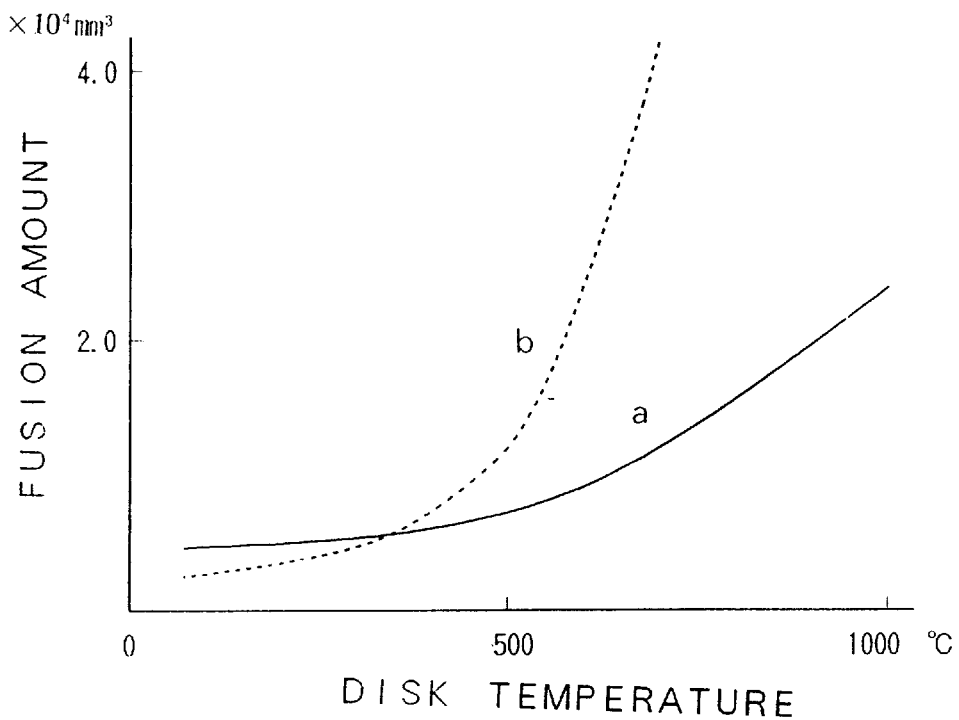
FIG. 3 is a graph showing disk temperature—pad fusion amount characteristic.
Figure 4:
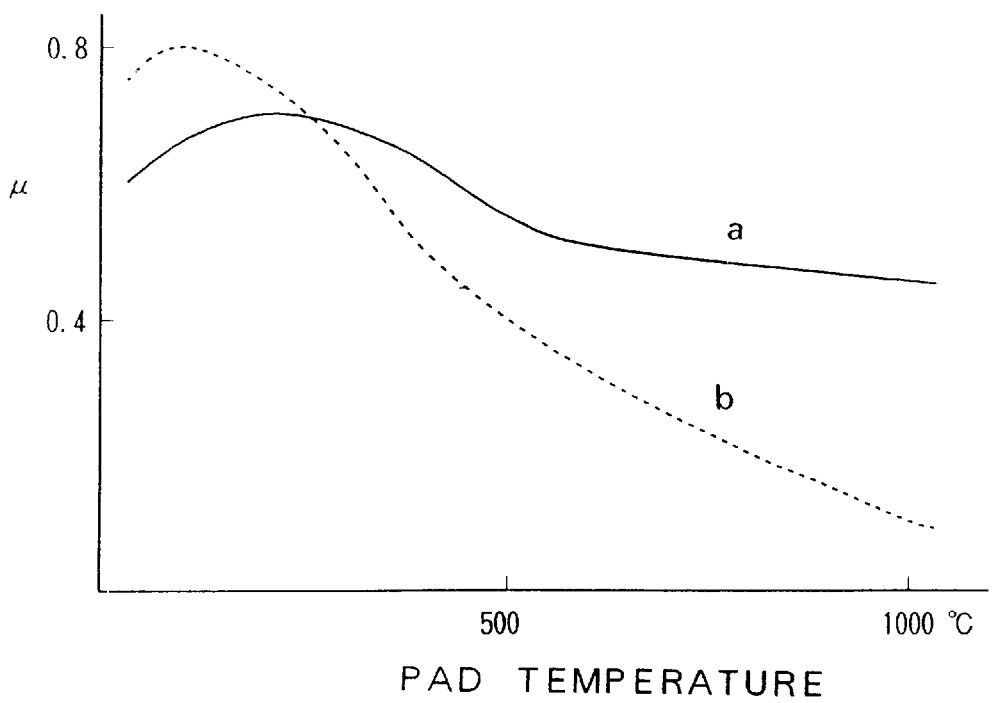
FIG. 4 is a graph showing pad temperature—$\mu$ characteristic.

FIGS. 3 and 4 show abrasion-resistance and μ characteristic of pads.

In FIG. 3 showing disk temperature—pad fusion amount characteristic, the horizontal axis shows the disk temperature and the vertical axis shows the fusion amount ($\times 10^4$ $mm^3$). Characteristic resulting from a combination of the friction pad of the present invention having foundation based on titanium and/or titanium alloy and a disk (made of titanium alloy) is shown by the solid line a, and characteristic resulting from a combination of a customary pad (Cu series pad for example) and the disk is shown by the dotted line b.

In case of the customary pad, the fusion amount increases hastily at a temperature below 500° C. On the one hand, in case of the friction pad of the sintered friction material of the invention, the fusion amount is almost not changed at 500° C. and barely reaches $2.0 \times 10^4$ $mm^3$ at 1000° C. It is clear that the pad of the invention has excellent heat-resistance and abrasion-resistance.

In FIG. 4 showing pad temperature—μ characteristic, the horizontal axis shows the pad temperature and the vertical axis shows μ (friction coefficient). In case of the customary pad (dotted line b), μ is high at a low temperature but decreases with increasing temperature. On the one hand, in case of the pad of the invention, μ is not changed even if temperature rises to exhibit excellent heat-resistance and abrasion-resistance.

The sintered friction material of the present invention having a foundation of titanium and/or titanium alloy is light weight, corrosion resisting and heat resisting, has excellent high-temperature strength, heat-resistance and abrasion-resistance, can ensure a stable high friction coefficient and does not seize on another material. Therefore, the sintered friction material of the invention is particularly suitable to a pad for a brake rotor made of titanium or titanium alloy.

What is claimed is:

1. A friction material comprising a foundation of titanium and/or titanium alloy, a solid lubricant and a siliceous fibrous hard phase.

2. The material of claim 1, wherein said hard phase is mullite.

3. The material of claim 1, wherein said foundation further contains at least one element selected from the group consisting of Al, Ni, Co, Fe, Mn, Cu, V, and Zr.

4. The material of claim 1, wherein said lubricant is selected from the group consisting of graphite, $MoS_2$, BN and $CaF_2$.

5. The friction material according to claim 1, wherein said material is shaped into a size suitable for use as a brake pad.

6. The friction material according to claim 5, wherein said material is lined and joined to a plate.

7. The material according to claim 1, made by the process of shaping and sintering a mixture of titanium powder and/or titanium alloy powder, said solid lubricant and said fibrous hard phase.

8. A method of making a material according to claim 1, comprising performing the steps of mechanical alloying, followed by sintering.

9. A friction material comprising a foundation of titanium and/or titanium alloy and at least one element selected from the group consisting of Al, Ni, Co, Fe, Mn, Cu, V, and Z; a solid lubricant selected from the group consisting of graphite, $MoS_2$, BN and $CaF_2$; and a fibrous hard phase.

10. A sintered friction material comprising a foundation of titanium and/or titanium alloy, a solid lubricant and a hard phase, such that said friction material is suitable for use with a brake rotor made of titanium or titanium alloy.

11. The material according to claim 10, wherein heat resistance measured by fusion amount is less than $1 \times 10^4$ at 500 degrees Centigrade.

12. The material according to claim 11, wherein heat resistance measured by fusion amount approximates $2\times10^4$ at 1000 degrees Centigrade.

13. The material according to claim 10, wherein said foundation further comprises least one element selected from the group consisting of Al, Ni, Co, Fe, Mn, Cu, V, and Z; wherein said solid lubricant is selected from the group consisting of graphite, $MoS_2$, BN and $CaF_2$; and wherein said hard phase is fibrous.

14. The material according to claim 13, wherein said fibrous hard phase is mullite.

15. The material according to claim 10, wherein said material is shaped into a pad, and is lined and joined onto a holder plate.

16. A sintered friction material comprising a foundation of titanium and/or titanium alloy, a solid lubricant and a fibrous hard phase, wherein said material is (a) shaped into a pad, (b) lined and joined onto a holder plate, and (c) suitable for use with a brake rotor made of titanium or titanium alloy.

* * * * *